United States Patent [19]
Woodsum et al.

[11] Patent Number: 5,235,558
[45] Date of Patent: Aug. 10, 1993

[54] CHOKE POINT BISTATIC SONAR

[75] Inventors: Harvey C. Woodsum, Bedford, N.H.; Joseph J. Stapleton, Norton, Mass.

[73] Assignee: GTE Government Systems Corporation, Waltham, Mass.

[21] Appl. No.: 887,204

[22] Filed: May 21, 1992

[51] Int. Cl.[5] .............................................. G01S 15/00
[52] U.S. Cl. ...................................................... 367/92
[58] Field of Search ............................ 367/92, 138, 60

[56] References Cited

U.S. PATENT DOCUMENTS

| | | | |
|---|---|---|---|
| 4,320,474 | 3/1982 | Huckabay et al. | 367/92 |
| 4,330,873 | 5/1982 | Peterson | 367/60 |
| 4,939,702 | 7/1990 | Murphee | 367/138 |

Primary Examiner—Daniel T. Pihulic
Attorney, Agent, or Firm—J. Stephen Yeo

[57] ABSTRACT

A sonar system for use in a water body includes a projector on the bottom of a water body for generating and transmitting a direct beam of acoustic energy. A receiving array is immersed in the water body outside the direct beam for detecting reflections from an target in the direct beam. The receiving array may be a horizontal or vertical linear array of hydrophones in the water body. The array of hydrophones may have output signals coupled to an A/D convertor and a multiplexor for digitizing and multiplexing the signals to prepare for transmission and analysis of the signals. A pair of separated projectors on the bottom of the water body may generate parametric acoustic arrays for transmitting direct beams of acoustic energy through the water body towards each other. A receiving array immersed in the water body outside the direct beams detect any reflections from an object in the acoustic beams.

3 Claims, 3 Drawing Sheets

CHOKE POINT BISTATIC SONAR

RELATED COPENDING APPLICATIONS

The following applications, filed concurrently with this, are concerned with aspects of bistatic sonar systems using parametric acoustic arrays:

PLATFORM CARRIED BISTATIC SONAR, Ser. No. 07/887,438, filed May 21, 1992.

PLANAR PARAMETRIC SONAR ARRAY, Ser. No. 07/887,204, filed May 21, 1992.

BISTATIC/MONOSTATIC SONAR FENCE, Ser. No. 07/886,613, filed May 21, 1992.

BACKGROUND OF THE INVENTION

The present invention relates to the field of underwater sonar equipment, and more particularly, to shallow water sonar.

Existing sonar systems effectively detect targets in deep water, but are less effective against targets immersed in shallow water. Prior to the present invention, it had been difficult to cope with the reverberation and multipath returns found in shallow water. Reverberation is a narrow bandwidth, noise-like signal from a variety of sources in the undersea environment, such as temperature and density imhomogeneities in the sea, marine life, rough features of the ocean bottom, and reflecting facets and bubbles at the ocean surface. Reverberation interferes with the acoustic echo from a submerged target, particularly in the case of slowly moving targets. Since the sources of reverberation are slowly moving as well, the doppler frequency shift associated with echoes from the reverberation sources are comparable to those from the target, weakening the discrimination between target and reverberation. Reverberation interferes with the acoustic echo from a submerged target.

These problems restrict detection range, heretofore requiring the use of more equipment to cover a given search area. Other problems encountered with conventional active sonar systems are, severe propagation losses from multiple encounters with the ocean surface and bottom; and loss of signal coherence due to the multipath nature of the propagation in shallow water.

SUMMARY OF THE INVENTION

Briefly, according to one aspect of the invention, a sonar system for use in a water body includes a projector on the bottom of a water body for generating and transmitting a direct beam of acoustic energy. A receiving array is immersed in the water body outside the direct beam for detecting reflections from an target in the direct beam.

DETAILED DESCRIPTION OF THE INVENTION

Figure 1:
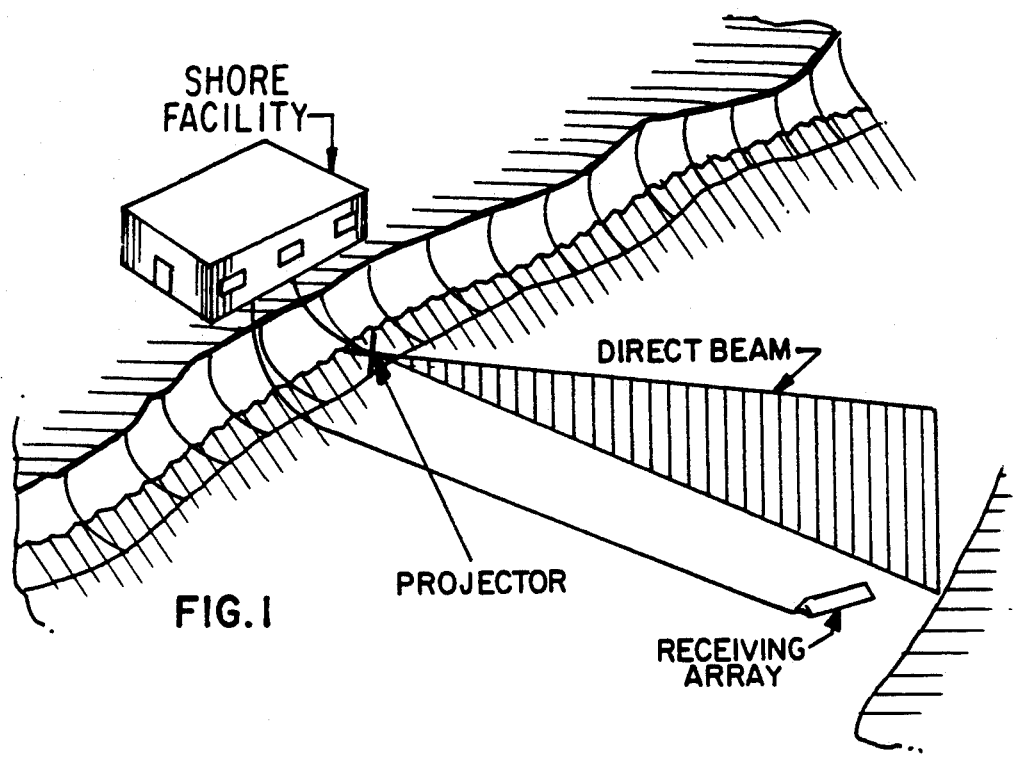
FIG. 1 is a schematic representation of a sonar system embodying the invention which uses one projector.

A parametric acoustic array generates very directive, sidelobe free sound beams without the use of large physical arrays. A projector has one or more transducers as elements. Two co-propagating beams of sound at different but close frequencies ("primary waves") or a single amplitude modulated carrier from a projector interact nonlinearly in the water column before the projector to generate sum and difference frequency beams to generate a virtual array. Only the difference frequency wave is considered here as it is much lower in frequency than either primary wave, and so propagates to longer ranges. The highly directive beam results in a greatly reduced reverberation level and in increased signal coherence from reduced multipath.

The receiver may be a high gain array, with preference in most undersea environments being given to a Horizontally Disposed Linear Array (HDLA) because its array gain is normally not limited by signal propagation conditions, as with a vertically disposed linear array (VDLA).

Placement of the receiving array outside the main lobe of the transmit beam reduces interference between the directly propagating signal and the reflected/scattered echo. Such bistatic geometry and a low sonar frequency reduces propagation losses and reduces the obscuration of low speed targets by reverberation clutter.

The optimum sonar frequency is that which maximizes the signal to noise ratio (SNR), for a particular projector-target-receiver geometry, with respect to frequency. The optimum frequency value f satisfies:

$$\delta (SNR(f,p)/\delta f = 0$$

where p comprises the set of other parameters on which the signal to noise ratio depends.

For a given bistatic geometry, the Signal to Noise Ratio (SNR) at the receiver in decibels (dB) is as follows:

$$SNR = SL - (TL1 + TL2) + TS - (INL-AG) + PG$$

where,

SL is the Source Level at the parametric difference frequency, TL1 and TL2 are the transmission losses along each of the bistatic path legs—(TL1 being the loss associated with the path from projector to target and TL2 being the loss associated with the path from the target to receiver).

TS is the bistatic target strength for the submerged object (target) at the aspect(s) presented to the projector and receiver.

INL is the interference level in dB/ 1 microPascal within the receiver passband. The interference level is the dB value of the sum of the reverberation plus ambient noise power values.

AG is the array gain of the receiving array; for a Horizontal Linear Array, the array gain is approximately $10 \log_{10}(N)$ where N is the number of hydrophone elements at half-wavelength spacing.

PG is the signal processing gain for the active waveform employed.

With most pulsed waveforms, the following approximate rules apply:

For gain against ambient noise, $PG_{(noise)} = 10 \log_{10}(T)$, where T is the pulse length in seconds.

For gain against reverberation, $PG_{(reverb)} = 10 \log (W)$ up to $PG_{MAX}$, where W is the bandwidth in Hertz (Hz). $PG_{MAX}$ is an upper limit on reverberation strength where the duration of the main lobe of the waveform autocorrelation function becomes smaller than the travel time of the pulse across the target. Above this limit, the target strength and reverberation level decrease at approximately the same rate as individual target echo sources become resolved individually in time.

Several of the above terms are frequency sensitive; the optimum frequency is obtained by either using an analytical model for the factors in the sonar equation of SNR, and finding the point where the derivative of SNR with respect to frequency equals zero; or by using numerical models for each effect and searching over frequency to find the frequency which maximizes SNR. If the projector area, primary frequency, and input electrical power are held fixed, source level (SL) is proportional to 40 log f (f is difference frequency) in the Westervelt endfire regime, or 20 log f in the farfield generation regime. The endfire generation regime is the regime of operation where the difference frequency is generated in the nearfield of the primary beam, where the beam is well collimated, and represents the first results treated by Westervelt in his original paper on the parametric array; the farfield generation regime is where the difference frequency generation takes place mostly in the farfield of the primary beam, where the primary waves are spherically spreading. On the other hand, projector parameters can be arranged so that the projector level is held constant during the optimization.

A single model of shallow ocean transmission loss given by Urick, Principles of Underwater Sound for Engineers, McGraw-Hill Publishers, 1967, pp. 146–147 is, at long ranges, $$TL = 20 \log_{10} r + \alpha r + + a_T(r/H - 1) + 10 \log_{10}(H) + 64.5 - K_L$$

where r is the range in thousands of yards (Kyds), $\alpha$ is the attenuation coefficient in dB/Kyd, H is a parameter defined by:

$$H = [(\tfrac{1}{2})(D+L)]^{\tfrac{1}{2}}$$

where D is the water depth in feet, L is the depth of the isothermal "mixed layer" or surface duct, in feet, and H is in Kyds. The parameters $a_T$ and $k_L$ given by Urick are semi-empirical model parameters derived from transmission loss data, and are a function of ocean surface sea state number, ocean bottom sediment type, and frequency.

The limiting noise for detection may be assumed to be the ambient noise of the sea, which has a power spectrum dependence on frequency of −6 dB/octave, corresponding to a functional dependence of −20 log (frequency). Assuming the ambient noise is isotopic spatially, the dependence of array gain on frequency is given by 10 log f. The optimum sonar frequency may be calculated by substituting the preceding formulas for each term in the equation for signal to noise ratio, which can be solved numerically by calculating SNR over a wide range of sonar frequencies and picking a frequency which yields the largest SNR within the precision of the search range. For example, the optimum frequency calculated for a system configuration with a 600 foot ocean region with a sandy bottom is 4.25 KHz, when one desires a 10 nautical mile detection range, and the receiver is arranged to achieve maximum detection coverage of any submarine crossing through the beam out to a range of 10 nautical miles. The beamwidth of the difference frequency wave is relatively narrow considering the low frequency, providing high angular resolution. In shallow water, the narrow beamwidth results in reduced reverberation as the beam can aimed to avoid the top and bottom surfaces of the water body.

These factors are particularly important for operation in shallow water, less than 1000 meters in depth, since propagation losses and reverberation are high due to repeated interaction of the propagating sonar signal with the water body's surface and bottom in contrast to operation in deeper water.

In conventional monostatic operation, the projector and detector are located at the same location and the detector receives the direct beam from the projector as well as beams reflected from the target, e.g. submarines and divers.

In bistatic operation the projector and detector are at different locations. The detector may located to receive beams reflected off the target but not beams direct from the projector. Detectors placed outside the direct beam of the projector reduce interference by the direct transmitted signal with the target echo. Bistatic detectors may detect a doppler frequency shift on the received echo, even though the target may have a direction of motion perpendicular to the projector beam, thereby returning an echo with no doppler shift in the direction of the projector. A monostatic sonar which had its receiving array co-located with the projector would in such circumstances find significant interference between reverberation from the medium, which is at or near zero doppler, and the echo from the target.

Since target detection is based on active transmission, the passive signature and quietness of the target are of little interest, resulting in a detection sonar effective against a wide array of possible targets.

Reference is made to FIG. 1. As an embodiment of the invention, there is seen a rapidly deployable sonar system for use in choke point applications in shallow water. The system includes at least one projector and at least one acoustic receiving array. The projector and acoustic receiving array is placed on a shallow area of the water body's bottom.

Power is either cabled from shore, from a nearby ship, or is provided by a local power source, such as a battery. The parametric acoustic array is constructed to allow either mechanical steering of the sonar beam direction, via a pan and tilt arrangement, or electrical steering though application of appropriate time delays to phase the signals applied to each transducer element of the acoustic array. The direct beam from the projector is steered in a direction which results in maximum coverage of the water column, accounting for refraction of the beam due to the sound velocity profile, and is resteered as the conditions change.

The receiving array consists of a linear array of passive hydrophone elements arranged in a horizontal configuration. Alternatively a vertical array may be used. The receiving array is placed outside the direct beam to reduce the effects of interference between the direct signal from the projector and the echo signal arriving from the target. Placement of the receiving array is chosen so that the array lies within the detection range of a target within a the beam for all ranges out to the maximum allowable detection range. A bistatic propagation loss analysis is used to accomplish the array placement according to this criterion. Additional siting considerations can include calculations of target echo doppler shift; positions further along a perpendicular from the projector beam increase the observable doppler shift of a target crossing the beam, thereby improving the ability of the system to discriminate moving from non-moving targets.

Figure 2:
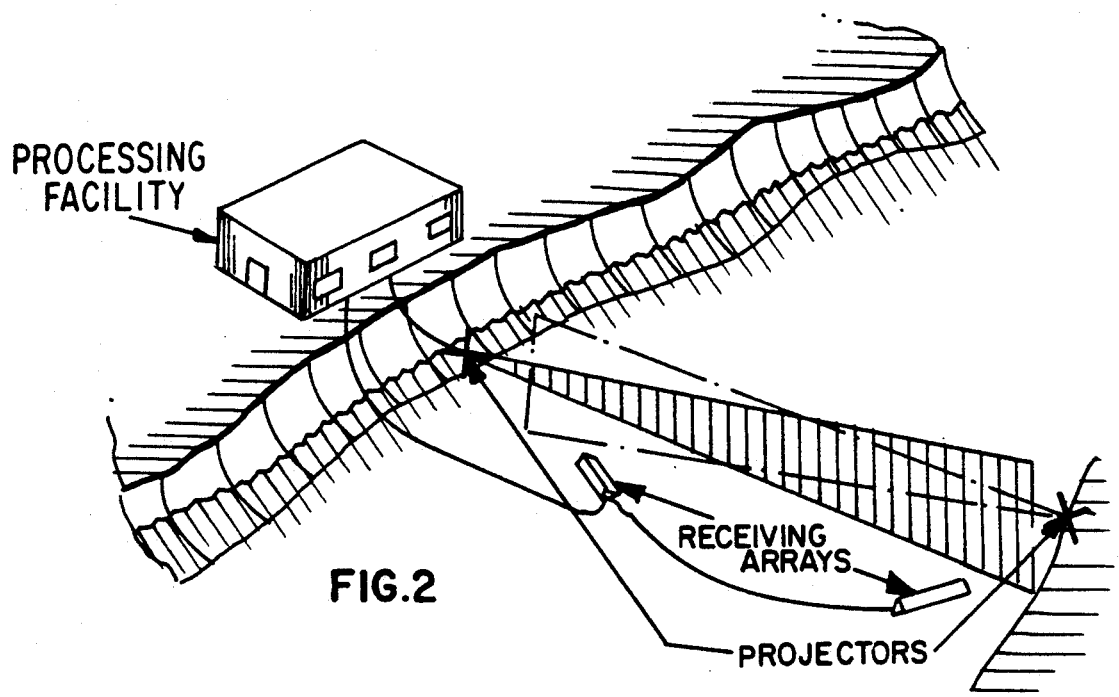
FIG. 2 is a schematic representation of the sonar system using two facing projectors.

Reference is made to FIG. 2. For better coverage two projectors may be used, facing each other from each side of the choke point of the water channel to be surveyed. The direct beams from the two projectors partially overlap. Additional receiving arrays may be located outside the beams to increase the probability of detection.

A projector may be a line-in-cone transducer, similar to the International Transducer Corporation (Santa Barbara, Calif.) type 5392. This transducer has an acoustic diameter of 24 inches, providing a 3 dB beamwidth of 5 degrees at 30 kHz. It is capable of handling 3.5 kW input power.

A tuning/matching network may be included in a cavity in the projector housing. A cable connects the projector to a topside or ashore power amplifier which provides the required drive for the projector. The projector is mounted on a gimbaled structure to allow for gross orientation with respect to the detector.

The linear array may have 50 hydrophones/preamplifiers mounted in a triangular enclosure. Each hydrophone may be similar to Model ITC-4046, manufactured by International Transducer Corporation. The array is preferably mounted on a gimboled frame to allow for orientation with respect to the projector. The total length of the array and enclosure is approximately 25 feet. Pre-amplifiers, D/A converters, and a multiplexer may be included as part of the array assembly. Individual signals from each hydrophone will be brought by cable to the surface or to shorebased equipment.

The power amplifier provides up to 4 kW continuous output. The amplifier may be similar to the S11-4 linear switching amplifier manufactured by Instruments Incorporated of San Diego, Calif.

The changing Doppler frequency from maneuvering targets modulates the CW pulse. The maximum Doppler bandwidth is estimated at 90 Hz.

Figure 3:
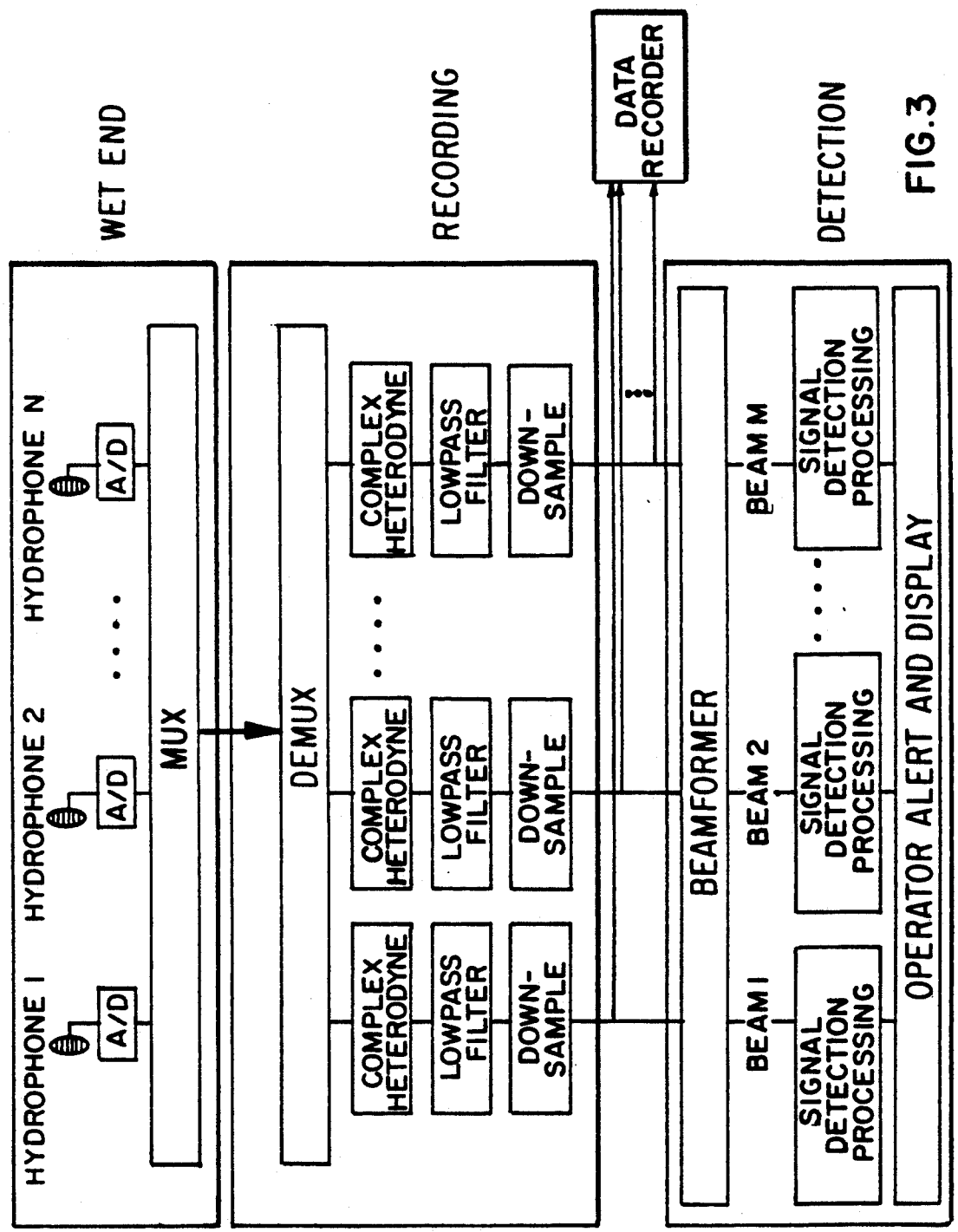
FIG. 3 is a block diagram of a signal processor suitable for use with the invention.

Referring to FIG. 3, digital signal processing is used to detect sonar returns. Rejection of the direct wave is accomplished by use of adaptive beamform type nulling in the direction of the arriving direction signal transmission. The nulling algorithm in most cases is required to perform placement of nulls on each raypath from the projector which has sufficient level to interfere with an echo signal. For an M element receiving array, M-1 such nulls can theoretically be formed, which is more than ample, since it is usually the case that no more than a few paths have sufficient strength to cause interference with the echo. Each analog voltage output of the hydrophone elements is separately digitized at the Nyquist frequency of the difference frequency plus the Doppler bandwidth. The N digitized acoustic signals are multiplexed into one data stream which is sent to the signal processor. There the multiplexed data stream is demultiplexed back into the N acoustic channels. Each channel is separately complex heterodyned to baseband, passed through an anti-aliasing low pass filter, and downsampled to the Nyquist frequency of the information signal which is equal to the Doppler bandwidth with complex sampling. The N downsampled acoustic channels, with their greatly reduced sampling rate, are appropriate for recording for subsequent non-real time processing.

A block adaptive minimum variance distortionless look algorithm is employed. In the Minimum Variance Distortionless Look, (MVDL) algorithm, an interference covariance matrix estimate is formed by time averaging products of complex voltages from hydrophones in the array when the direct signal transmission from the projector is received. Averaging of the estimate of multiple transmission cycles is performed to improve the Covariance Matrix estimate.

MVDL beamforming is accomplished by premultiplying the complex hydrophone voltages by the inverse of the estimated Covariance Matrix prior to conventional beamforming. The algorithm produces a beam which has unity gain in a selected look direction, and a minimum variance output, thus effectively placing spatial nulls on any interfering signals from other than the desired look direction. The outputs of each adaptively formed beam are processed via a set of matched filters which incorporated possible doppler shifts of the echo signal with respect to the transmitted waveform. The outputs of each matched filter are enveloped detected and thresholded.

In more detail, the baseband signal is processed with an adaptive digital beamforming algorithm which adapts over several ping cycles of the active projector in order to minimize interference from the projector with any echo signals arriving at the bistatic detectors.

Coherent combination of all N channels with phase shifts makes the returns from one direction add constructively. The beam directions are chosen so that the main lobes overlap significantly; this reduces scalloping loses when detecting returns form a direction between two beams. For a regular array of hydrophones, the formation of all beams can be implemented simultaneously as an FFT, thus reducing the processing burden. The beams are designed with a compromise between minimizing the width of the main lobe and minimizing the power in the side lobes. With the FFT implementation, this is controlled by the spatial weighting function for the N channel inputs.

Figure 4:
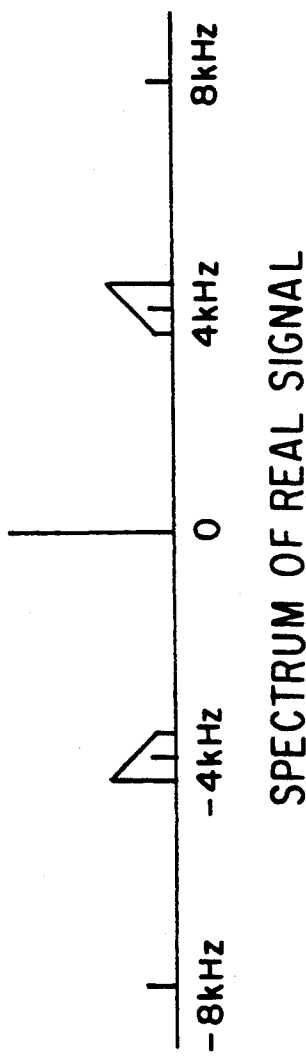
FIG. 4 represents selected processed signals.
Figure 4:
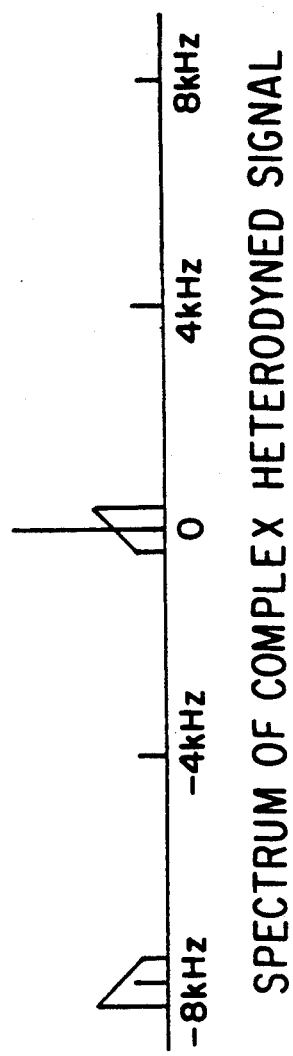
Figure 4:
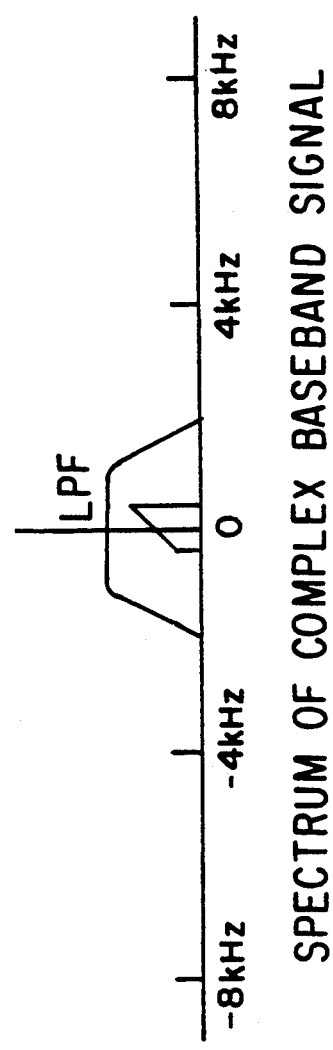

Signal detection is implemented in parallel for all of the beams. If the targets will be non-maneuvering, so matched filtering provides optimum detection in Gaussian noise. The matched filter for a CW pulse can be implemented as an FFT (Fast Fourier Transformation). Detection is performed by looking for the maximum FFT bin as seen in FIG. 4. The corresponding frequency is an estimate of the Doppler frequency. Zero padding is used to increase frequency resolution, and also to improve detection performance for Doppler frequencies in between two bin frequencies. The length of the non-zero data from the beam is matched to the pulse length. Overlapped FFTs are used to avoid the performance loss associated with splitting the energy of a pulse return between two FFTs.

The preferred embodiment and best mode of practicing the invention has been described. Various modifications will be apparent to those skilled in the art in light of these teachings, Accordingly, the scope of the invention is to be determined by the following claims.

What is claimed is:

1. A sonar system for use in a water body, comprising:
   a projector on the bottom of said water body for generating and transmitting a direct beam of parametric acoustic energy; and a receiving array immersed in said water body outside said direct beam for detecting reflections from an target in said direct beam, wherein said receiving array is a horizontal linear array of hydrophones on the bottom of said water body.

2. A sonar system for use in a water body, comprising:
a projector on the bottom of said water body for generating and transmitting a direct beam of parametric acoustic energy; and a receiving array immersed in said water body outside said direct beam for detecting reflections from an target in said direct beam, wherein said receiving detector is a vertical linear array of hydrophones.

3. A sonar system for use in a water body, comprising:
a pair of projectors on the bottom of said water body for generating and transmitting direct beams of parametric acoustic energy through said water body towards each other; and a receiving array immersed in said water body outside said direct beams for detecting reflections from an object in said acoustic beams.

* * * * *